(12) United States Patent
Haven et al.

(10) Patent No.: US 10,023,997 B2
(45) Date of Patent: Jul. 17, 2018

(54) WATER-BASED COATINGS FOR COLOR SAMPLING

(71) Applicant: AXALTA COATING SYSTEMS IP CO., LLC, Wilmington, DE (US)

(72) Inventors: Michael Haven, Maple Grove, MN (US); Michael Gustafson, Eagan, MN (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 15/635,286

(22) Filed: Jun. 28, 2017

(65) Prior Publication Data

US 2017/0298573 A1   Oct. 19, 2017

Related U.S. Application Data

(60) Division of application No. 14/173,399, filed on Feb. 5, 2014, now Pat. No. 9,695,336, which is a continuation of application No. PCT/US2012/041245, filed on Jun. 7, 2012.

(60) Provisional application No. 61/494,200, filed on Jun. 7, 2011.

(51) Int. Cl.
*D21H 19/58* (2006.01)
*D21H 19/62* (2006.01)
*D21H 25/06* (2006.01)

(52) U.S. Cl.
CPC ............. *D21H 19/62* (2013.01); *D21H 19/58* (2013.01); *D21H 25/06* (2013.01)

(58) Field of Classification Search
CPC .. C09D 177/00; C09D 5/028; C09D 123/283; C09D 133/00; C09D 163/00; C09D 167/00; C09D 175/04; D06M 11/07; D21H 19/26; D21H 19/56; D21H 19/62
See application file for complete search history.

(56) References Cited

U.S. PATENT DOCUMENTS

| | | |
|---|---|---|
| 2,409,285 A | 10/1946 | Jacobson |
| 3,384,983 A | 5/1968 | Olson |
| 3,511,213 A | 5/1970 | Reed et al. |
| 5,275,566 A | 1/1994 | Yang |
| 5,370,024 A | 12/1994 | Lerner et al. |
| 5,728,427 A | 3/1998 | Akkerman et al. |
| 6,156,420 A | 12/2000 | Hosselbarth et al. |
| 6,166,127 A | 12/2000 | Tomko |
| 6,416,612 B1 | 7/2002 | Lerner et al. |
| 6,479,577 B1 | 11/2002 | Paulus et al. |
| 6,994,553 B2 | 2/2006 | DaRif et al. |
| 7,007,601 B2 | 3/2006 | Winter et al. |
| 7,057,728 B2 | 6/2006 | Takada et al. |
| 7,479,511 B2 | 1/2009 | Laksin et al. |
| 7,728,068 B2 | 6/2010 | Killilea |
| 7,888,424 B2 | 2/2011 | Jaworek et al. |
| 8,629,882 B2 | 1/2014 | Henry |
| 2005/0197419 A1 | 9/2005 | Graziano et al. |
| 2010/0021754 A1 | 1/2010 | Schlichting et al. |
| 2010/0249317 A1 | 9/2010 | Killilea et al. |

FOREIGN PATENT DOCUMENTS

| | | |
|---|---|---|
| DE | 102006014223 A1 | 10/2007 |
| EP | 1982845 A1 | 10/2008 |
| JP | 2005247884 | 9/2005 |
| JP | 4009866 B2 | 11/2007 |
| JP | 2008156415 | 7/2008 |
| WO | 9856990 A1 | 12/1998 |
| WO | 0058117 A2 | 10/2000 |

OTHER PUBLICATIONS

International Search Report for International Application No. PCT/US2012/041245, dated Jan. 30, 2013.
International Preliminary Report on Patenlability International Application No. PCT/US2012/041245, dated Dec. 10, 2013.
Supplementary European Search Report for EP Patent Application No. 12 79 6373, dated Feb. 20, 2015.
Definition of Sizing provided from PrintWiki the Free Encyclopedia of Print, accessed online at printwiki.org/Sizing on Jun. 28, 2017.

*Primary Examiner* — Robert S Walters, Jr.
(74) *Attorney, Agent, or Firm* — Lorenz & Kopf, LLP

(57) ABSTRACT

A color sampling display product is provided that includes a radiation-curable water-based coating composition applied to a substrate, and shows mechanical integrity and aesthetic appeal.

19 Claims, No Drawings

WATER-BASED COATINGS FOR COLOR SAMPLING

CROSS-REFERENCE TO RELATED APPLICATIONS

This application is a Divisional of U.S. application Ser. No. 14/173,399 which was filed on Feb. 5, 2014, entitled "WATER-BASED COATINGS FOR COLOR SAMPLING," which claims the benefit of Continuation of International Application No. PCT/US2012/041245 which was filed on Jun. 7, 2012, entitled "WATER-BASED COATINGS FOR COLOR SAMPLING," which claims the benefit of U.S. Provisional Application No. 61/494,200 filed on Jun. 7, 2011 and entitled "WATER-BASED COATINGS FOR COLOR SAMPLING," each of which is incorporated herein by reference in its entirety.

BACKGROUND

Paint colors are usually displayed and marketed to consumers using color sampling display products such as color cards, color chips or color swatches, via paint samples applied to or deposited on various substrates, including paper cards. Due to environmental restrictions, there is a significant need for lower volatile organic compound-containing (VOC-containing) paints, including in color display devices. Typically, lower VOC-containing coatings do not provide the physical characteristics or mechanical performance needed for color sampling display devices or color cards.

In an effort to provide a low VOC- or zero VOC-containing system with high performance, manufacturers have been using water-based polyurethanes. These water-based polyurethanes are usually linear polymers and produce films that have chemical resistance lower than the highly crosslinked films of solvent-based urethane systems. Preparing the polyurethane coating compositions by pre-crosslinking a water-based polyurethane polymer may be accomplished by incorporating a large amount of monomers that have more than two reactive functional groups in the prepolymer stage. However, this results in highly viscous prepolymer blends that cannot be easily dispersed in water. Reactive diluents can be used to address the viscosity problem, but these diluents may be highly irritating to the eyes, skin, or both, and extensive and impractical industrial hygiene measures are required to use these products.

Moreover, when water-based polyurethane polymers are applied to certain substrates, such as paper, for example, along with the dyes or colorants needed to manufacture a color sampling product, the paper will tend to wrinkle, buckle or curl. Sizing or treating paper to reduce absorption of water is time-consuming and does not necessarily prevent the buckling or curling of the paper. The presence of water in the polymers has severe impact on both the mechanical performance of the color display device and on its aesthetic appeal.

Therefore, what is needed are high-performance low VOC- or zero VOC-containing compositions that can be applied and cured to an untreated paper substrate to form a color display product or color sampling product with mechanical integrity and aesthetic appeal.

SUMMARY

The present description provides a method for making a color sampling display product, i.e. a device that accurately displays one or more colors. The method includes providing a paper substrate with at least a first major surface to which a coating composition can be applied, applying a film-forming amount of a radiation-curable coating composition including one or more polymers to the first surface of the paper substrate to form a visually opaque colored film, and using electron beam radiation to cure the coating composition, preferably an opaque layer of the composition, onto the substrate. Using radiation to cure the coating includes forming an interpenetrating network of crosslinks between the one or more polymers in the coating composition. In an aspect, the device can be a color card. Preferably, the paper substrate substantially retains mechanical integrity, i.e. does not undesirably wrinkle, buckle or curl after the coating composition is applied. The present description also provides coatings prepared from the composition described herein. For example, a coating as described herein is preparable by a method that involves applying a composition to an untreated paper substrate and curing the composition using radiation.

In one embodiment, a color display device is provided that includes an untreated paper substrate to which a radiation-curable acrylic coating composition has been applied and cured. The coating composition of this embodiment is substantially free of VOCs and typically includes less than 5 wt-% surfactant. The coating composition preferably includes a water-based polymer composition and a support polymer composition. In an aspect, the water-based polymer composition includes a water-dispersible polymer, such as, for example, polyurethane, epoxy, polyamide, chlorinated polyolefin, acrylic, oil-modified polymers, polyester, and mixtures or copolymers thereof. In an aspect, the water-dispersible polymer is an ethylenically unsaturated polyurethane, such as, for example, a polyurethane with (meth) acrylate functionality, or a polyurethane with auto-oxidative carbon-carbon double bonds.

In an embodiment, a coating composition is provided that includes a support polymer. In an aspect, the support polymer is a latex emulsion with at least a first stage where the monomers in the first stage would four' a polymer with a theoretical glass transition temperature between about 60° C. and about 110° C. In an aspect, the latex emulsion includes a styrene-acrylic emulsion. In another aspect, the support polymer includes a multi-stage latex emulsion, preferably a two-stage latex emulsion. In yet another aspect, at least a first stage of the multi-stage latex is formed from monomers that would form polymers having theoretical glass transition between about 60° C. and about 110° C. In another aspect, at least a second stage of the multi-stage latex is formed from monomers that would form polymers having theoretical glass transition between 10° C. to 50° C. In an aspect, at least a first stage of the multi-stage latex emulsion includes a styrene-acrylic emulsion. In another aspect, at least a second stage of the multi-stage latex emulsion includes an acrylic emulsion. In an aspect, the multi-stage latex is alkali soluble.

In an embodiment, a coating composition for a color display or sampling product is provided that includes efficacious amounts of one or more performance-enhancing additives. In an aspect, the performance-enhancing additives include, without limitation, waxes, flatting agents, additives to prevent mar and abrasion and the like. In an aspect, the waxes include water-soluble linear polymers.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings provided below.

As used herein, the terms "color sampling display product" or "color display product" mean a device, card, chart, deck, fan deck, color book, swatch, color sheet, accordion-style card, color chip or other visual representation that shows a paint color or range of related paint colors or color palette available from a manufacturer. The color display product may include a single "color chip" or color region disposed on a substrate, or the color display product may include a "color card," where a plurality of individual color regions are disposed on the front surface of a substrate, with the color regions displayed in adjacent registration on the substrate, and with or without optional white space between the individual color regions. The color regions on a color card may be in the form of spots, lines or bars of color, and the like. The individual colors or color regions on a color card are preferably color-fast, i.e. the colors or color regions resist fading and color migration on exposure to the environment. In addition, the individual colors or color regions on a color card are preferably light-fast, i.e. the colors are not changed by exposure to light, especially during storage. On the color display product, individual colors or color regions are preferably opaque, i.e. the individual colors or color regions do not transmit light through to the substrate material. The opacity of the individual colors or color regions on a color card contributes to color accuracy. A color card may show a single color with various possible finishes, a plurality of colors in a single finish, a plurality of colors in various possible finishes, a single color tone, or a plurality of color tones and the like. A color display product may include a single color card, or a collection of individual color cards, such as a fan deck of color cards, for example. The color display product may include elements or modifications that allow one or more colors disposed on a color card, for example, to be removed from the product. Similarly, the product may include elements or modification that allow one or more colors or color regions to be added to a color card.

The term "transparent" refers to a film of a coating composition that transmits all the light passing through the film, i.e. the film allows complete or near-complete transmission of visible light through it. Compositions that may be applied as transparent films include stains, glazed and the like, for example. The term "translucent" refers to a film that allows only partial or diffused transmission of light through the film. Examples of translucent surfaces include, without limitation, frosted glass, etched glass, and the like. The term "opaque" or "visually opaque" refers to a film that transmits essentially no visible light through the film. The light or radiation may be reflected, scattered or absorbed by the film.

As used herein, the term "(meth)acrylate" is meant to include acrylate and methacrylate. Similarly, the term "(meth)allyl ether" is intended to include allyl ether and methallyl ether.

The term "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as kilograms (kg) of VOC per liter. As used herein, the term "substantially free" with respect to VOC refers to compositions containing no more than 7 weight-percent (wt-%) VOC. More preferably, compositions of the present invention contain no more than 4 wt-% VOCs. Volatile organic compounds are defined in U.S. Pat. No. 6,048,471 and also in 60 Fed. Reg. 111 (Jun. 16, 1995).

As used herein, the term "water-dispersible" means the polymer itself is capable of being dispersed in water. For example, a polymer that can be dispersed in water without the use of a separate surfactant would be a water-dispersible polymer. Alternatively, water can be added to the polymer to make a stable dispersion. The term "dispersion" in the context of a dispersible polymer refers to the mixture of a dispersible polymer and a carrier and is intended to include the term "solution." As used herein, the term "stable" means that the dispersion should have at least one month shelf stability at normal storage temperatures. The term "water-dispersible" is intended to include the term "water-soluble" and the term "water-reducible." In other words, by definition, a water-soluble or water-reducible polymer is also considered to be a water-dispersible polymer.

As used herein, the term "ethylenic unsaturation" refers to the presence of carbon to carbon double bonds or auto-oxidative carbon-carbon double bond functionality. The carbon to carbon double bond can be in an aliphatic or cycloaliphatic compound, or in an aliphatic or cycloaliphatic side chain, substituent or other moiety. The carbon to carbon double bond can be part of vinyl, allyl or acrylate functionality, such as, for example, methacrylate, methallyl, (meth)acrylate, (meth)allyl and similar functionality.

As used herein, the term "surfactant" refers to a surface active agent. Such agents modify the interaction of a coating composition with the substrate, or support or stabilize a latex polymer. For example, a surfactant can be used to modify the ability of a coating composition to the wet the surface of a substrate, or a surfactant can be used to stabilize monomer droplets during emulsion polymerization of a latex. Surfactants may also include, without limitation, agents for leveling, foaming, defoaming, flow and the like. The surfactant affects the qualities of the coating composition, including how the composition is handled, how it spreads across the surface of the substrate, and the interfacial interaction between the composition and the substrate. The water-soluble dispersions included in the compositions described herein contain no more than 5 wt-%, preferably no more than 2 wt-% of surfactants.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another polymer molecule, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In an embodiment, the invention features a method of making a color sampling display product, i.e. a device that accurately displays one or more colors. The method preferably includes providing a substrate or portion thereof with at least a first major surface to which a coating can be applied, applying a film-forming amount of a polymeric composition including one or more polymers to the first major surface of the substrate, and curing the composition by electron beam radiation to form a visually opaque colored film on the substrate. When applied to the substrate, the low-VOC or zero-VOC coating composition provides a color display product with the mechanical integrity and aesthetic appearance required for such a product.

In the methods described herein, the radiation-curable coating composition is generally applied on a substrate having at least a first major surface and a second major surface. The coating composition described herein can be applied to the first surface or the second surface, or both. In another aspect, the substrate is any material that can be used to make a color sampling display product, including for example, a metal substrate, a paper substrate, a non-woven substrate, a polymer film, a magnetic substrate, and the like. In a preferred embodiment, the radiation-curable coating composition is applied to at least the first major surface of a paper substrate.

In a preferred embodiment, the method described herein includes the step of applying a radiation-curable acrylic coating composition to a paper substrate, and the coating composition further includes a water-based polymer composition and a support polymer composition. Typically, when a water-based coating is applied to the surface of a cellulosic substrate such as paper, for example, the substrate tends to wrinkle, buckle or curl, thereby reducing the mechanical integrity, and aesthetic appeal of the ultimate color sampling display product. Without being bound to theory, this is believed to be a result of the water migrating into the pores of the substrate and the absorption of water by the paper through capillary action. Conventionally, paper substrates are therefore sized or treated in order to seal the pores in the paper and prevent migration of water from the coating composition. With specific reference to the methods described herein, the terms "size", "sizing", "treatment" or "pretreatment" refer to a specific substance or material applied to, disposed on or incorporated into paper to act as a protective glaze or filler, i.e. to prevent migration of water into the pores of the paper, and/or change the absorption and/or wear properties of the paper. The terms are not meant to include other forms of treatment, i.e. substances or materials applied for other purposes, such as pigments, primers, adhesives, and the like, for example. Sizing or pretreatment of the paper substrate is, however, time-consuming and does not entirely prevent absorption of water by the paper. Sized paper substrates are relatively thick and are not generally cost-effective as substrates for the color display product described herein. In an aspect, the methods described herein include the step of applying a radiation-curable acrylic coating composition to a paper substrate that is untreated, i.e. not sized, prior to application of the coating composition, but maintains its mechanical integrity.

With specific reference to this application, "maintaining mechanical integrity" means the paper substrate does not undesirably wrinkle, buckle or curl when the coating composition described herein is applied. Mechanical integrity may be assessed by reference to tensile stiffness index (TSI; expressed as Nm/kg). TSI is a ratio of the tensile stiffness (i.e. the elastic modulus of the paper multiplied by thickness of the paper) to the grammage (i.e. paper density) of the paper substrate after coating and curing. Methods for measuring TSI are known to those of skill in the art.

Mechanical integrity may also be assessed as a function of paper curl. With specific reference to this application, paper curl represents a deviation of the paper substrate from a flat or substantially planar orientation. Various methods for observing and measuring curl in paper, including the hot bend curl test and the warm oven test, are known to those of skill in the art. In the hot bend test, curl represents the difference between the fiber orientation of the wire side of a paper substrate and the felt side of the same substrate. In the test, a strip of the paper substrate is held up against a solid aluminum block heated to about 150° C. for about 1-2 seconds and the curvature of the paper is measured. Changes in curvature of the paper represent deformation, i.e. deviation from a flat or substantially planar orientation during a process involving heat, i.e. printing, copying, coating, etc. In the warm oven test, sheets of the paper substrate are suspended in an oven heated to 80 to 95° F. for 60 seconds. The sheets are then removed and hanging curl is measured. In both tests, optimal curl is seen when the wire side and felt side measure the same after the test.

In a preferred method, curl is measured as follows. Colorants are mixed with a base formulation to obtain paint of a specific color. The paint is applied to a paper substrate as a 140 μm (approximately 5.5 mil) drawdown. The paint is then cured on the substrate to provide a coated paper substrate. The coated paper substrate is placed on a flat, dry surface with the coated surface facing up. After 15 minutes, the paper is observed for lifting or curl away from the flat surface. The coated paper substrate described herein has curl tolerance of no more than about ±5 to 10 mm (approximately ±0.2 to 0.4 in), which represents an acceptable amount of deformation for a display product. In a preferred aspect, the display product should not demonstrate more than about 6 mm (approximately 0.25 in) of curl or deformation.

In an embodiment, the invention described herein includes methods of making a color sampling display product. In an aspect, the method includes providing an untreated paper substrate with at least a first major surface, or portion thereof, to which a coating composition can be applied. In an aspect, the first major surface to which a coating composition can be applied is the felt side of the paper substrate, in contrast to the wire side of the substrate, to which coating is not applied. In another aspect, the paper substrate is a laminate substrate including at least two layers of paper joined together in a way that a first and second major surface of the laminate are felt side surfaces to which a coating composition can be applied. Examples of suitable paper substrates for the methods described herein include, without limitation, card stock, paper board, laminate, and the like. In an aspect, the paper substrate has thickness suitable for use in a color card or color display product. For example, a suitable paper substrate has thickness in the range of about 25 µm to about 250 µm, more preferably of about 50 µm to about 175 µm, most preferably about 50 µm to about 125 µm. Paper with high opacity, i.e. card stock, is generally preferred. Paper substrates having various finishes, i.e. matte, semi-gloss, and gloss finishes can be used in the methods of the invention.

In an embodiment, the method described herein includes the step of applying a film-forming amount of a radiation-curable acrylic coating composition to a first surface of a paper substrate to form a visually opaque colored film. A film-forming amount of the coating composition refers to the amount of the composition necessary to form a cohesive and substantially continuous layer that covers the surface or portion of the surface of a substrate. The actual amount will vary depending on the type and composition of the coating, the type and composition of the substrate and the end use for the coated substrate. In an aspect, a film of the coating composition applied to the substrate has a dry film thickness of 25 µm to about 250 µm, more preferably of about 50 µm to about 175 µm, most preferably about 25 µm to about 50 µm.

A film-forming amount of the composition can be applied by conventional methods known to those of skill in the art, such as bar-over-roll coating, knife-over-roll coating, gap coating, dip coating, reverse-roll coating and the like, for example. In an aspect, bar-over-roll coating is preferred. A film-forming amount of the composition can also be applied by direct deposition of the coating on to the substrate. Methods for direct deposition are known to those of skill in the art and include, for example, direct application, spray deposition, electrodeposition, electophoretic deposition and the like. For direct application, it is known in the art to use apparatus or mechanized equipment to apply carefully metered film-forming amounts of the composition on to the substrate, where the amount applied is regulated by varying pressures and flow rates. In an aspect, direct application of the composition is preferred.

In an embodiment, the methods described herein including applying a radiation-curable acrylic coating composition to a substrate. "Radiation-curable" refers to a process for drying and hardening the coating composition on to the substrate using radiation. Various forms of radiation can be used, including, for example, thermal radiation, ultraviolet (uv) radiation, visible light, electron beam, and the like.

In an embodiment, the method described herein includes the step of curing the coating composition applied to the substrate using electron beam radiation. Electron beam curing typically does not require the presence of a photoinitiator, and is particularly useful where the coating is impervious or opaque to visible light or uv radiation. Using electron beam radiation for curing allows curing to occur much more rapidly than previously possible. When the coating composition described herein is applied to a paper substrate, suitable curing rates include, for example, less than 200 ft/min (less than 60 m/min), about 200 ft/min to about 300 ft/min (about 60 m/min to about 90 m/min), about 300 ft/min to about 400 ft/min (about 90 m/min to about 120 m/min), about 300 ft/min to about 600 ft/min (about 90 m/min to about 190 m/min), about 400 ft/min to about 1000 ft/min (about 120 ft/min to about 300 m/min), about 500 ft/min to about 750 ft/min (about 150 m/min to about 250 m/min), and the like, or preferably, approximately 4 to 6 times faster than with solvent-based coating compositions cured by conventional methods.

Methods for curing of the coating composition by electron beam are known to those of skill in the art. Without being bound by theory, electron beams are typically generated by means of thermal emission and accelerated by way of a potential difference. The high-energy electrons then pass through a titanium foil and are guided onto the coating composition to cure it. Suitable conditions for curing include irradiating the composition applied to the substrate with high-energy electrons, typically at about 150 to 300 keV, in the absence of oxygen, such as under an inert gas atmosphere or an oxygen-reduced atmosphere, for example. Suitable inert gases are preferably nitrogen, carbon dioxide, noble gases or combustion gases. The penetration depth of the electron beam depends on the accelerating voltage used. Suitable accelerating voltage for electron beam cure of the coating described herein ranges from about 80 kV to about 150 kV. For example, at accelerating voltage of 150 kV, the penetration depth of the electron beam used for cure will be about 50-70 g/m$^2$. Irradiation may also take place by covering the coating with media that are transparent to the radiation. Examples of such media are, for example, polymeric films, glass or liquids such as water. Without being bound by theory, the electron beam includes high energy electrons that target the carbon-hydrogen bonds of the molecules in the coating composition and transfer their energy to the C—H bonds. This results in breaking of the bonds and abstraction of hydrogen from the coating composition to initiate cure and may cause crosslinks to form between the water-based polymer composition and the support polymer composition, i.e. between the polyurethane dispersion and the styrene-acrylic latex composition that are included in the coating composition of the invention.

Combinations of curing methods, including electron beam methods and other free-radical based techniques, including thermal radiation, uv radiation, and the like, for example, can be used to harden the coating composition on to the substrate. In an aspect, the coating compositions can be thermally cured, using suitable thermal initiators. Coating compositions that include (meth)acrylate and/or allyl functional groups are suitable for thermal curing. Coating compositions that include resins with vinyl ether functional groups can be cured by uv radiation or visible light, using cationic-generating photoinitiators. Coating compositions that include a mixture of (meth)acrylate, allyl ether, and vinyl ether functional groups can be cured using a combination of different curing procedures. Coating compositions that can be cured using uv radiation or visible light can also be cured using electron beam radiation.

In an embodiment, the method described herein includes the step of applying a film-forming amount of a radiation-curable acrylic coating composition to a first surface of a paper substrate to form a visually opaque colored film. In an aspect, the thickness of a film may affect the transparency or opacity of the film. A film less than 10 μm thick is likely to be transparent or translucent to light. On the other hand, film thickness of greater than 50 is likely to be opaque to both visible light and radiation. In a preferred aspect, the film is visually opaque and cured by electron beam radiation.

In a preferred embodiment, a film formed from the coating composition as described herein is opaque and preserves the light-fastness of the individual colors or color regions on a color card. In addition, if the film is not opaque, light can pass through the film, reflect off the substrate and back through the film altering the appearance the individual colors or regions of color on a color card and impairing color accuracy. Without being bound to theory, colorants and/or pigments included in a coating composition can influence light-fastness and color accuracy.

In an embodiment, the coating composition for use in the methods described herein is preferably a radiation-curable acrylic coating composition that includes a water-based polymer composition and a support polymer. In an aspect, the coating composition includes at least about 40 wt-% water, based on the total weight of the composition. Preferably, the coating composition includes no more than about 80 wt-% water and more preferably, no more than about 70 wt-% water, based on the total weight of the composition.

In an embodiment, the water-based polymer composition preferably includes a water-dispersed polymer. In an aspect, the water-based polymer composition includes a water-dispersible or oil-modified and water-dispersible polymer. These polymers are known in the coating industry and include a wide variety of polymers. Suitable water-dispersible polymers include, for example, polyurethanes, epoxies, polyamides, polyesters, chlorinated polyolefins, acrylics, oil-modified polymers, and mixtures and copolymers thereof. Such polymers are synthesized and made to be water-dispersible by conventional methods known to those of skill in the art.

In general, for water dispersibility, acid salt forming groups can be introduced into the polymer by a number of methods. For example, a water-dispersible polyurethane can be made by reacting a suitable compound (e.g., a polyisocyanate) with a compound containing active hydrogen and active acid groups neutralized by a neutralizing base. Suitable compounds having active hydrogen and active acid groups include hydroxy and mercapto carboxylic acids, aminocarboxylic acids, aminohydroxy carboxylic acids, sulfonic acids, hydroxy sulfonic acids, and aminosulfonic acids. Suitable neutralizing bases include inorganic bases such as sodium hydroxide, potassium hydroxide, lithium hydroxide, ammonia, triethylamine, and dimethyl ethanol amine.

Alternatively, for water dispersibility, basic salt forming groups can be introduced into the polymers by reacting a suitable compound (e.g., a polyisocyanate) with a compound containing active hydrogen groups and active basic groups neutralized with an acid. Suitable compounds having active hydrogen groups and active basic groups include aliphatic, cycloaliphatic and heterocyclic amino alcohols, diols and triols, amines, diamines, triamines, tetramines, and amides. Suitable neutralizing acids include organic acids such as formic acid and acetic acid, and inorganic acids such as hydrochloric acid and sulfuric acid. For example, urethanes can be made water-dispersible by incorporating amine or acid functionality. For example, water-based anionically stabilized polyurethane polymers are prepared by reacting polyols and dihydroxy carboxylic acid compounds with an excess of diisocyanate to provide a carboxylic acid functional prepolymer having NCO terminal groups. The acid groups can be neutralized with tertiary amines to provide salt groups. The neutralized prepolymer can be readily dispersed in water. Alternatively, the anionic stabilizing group of the water-dispersible polyurethane polymers can be replaced with cationic stabilizing groups or non-ionic stabilizing groups, to facilitate water dispersibility.

In an embodiment, the water-based polymer composition preferably includes a water-dispersed polymer, preferably water-dispersible polyurethane. In an aspect, the water-dispersible polyurethanes are ethylenically unsaturated. Preferred ethylenically unsaturated polyurethanes include (meth)acrylate or auto-oxidative carbon-carbon double bond functionality.

Ethylenically unsaturated polyurethanes as described herein can be made by a variety of methods known to those of skill in the art. For example, a suitable method for preparing water-dispersible polyurethane is by reacting one or more isocyanates with one or more hydroxy-functional compounds. Examples of isocyanates conventionally used in making polyurethanes include, without limitation, aliphatic, cycloaliphatic, aromatic isocyanates and the like. Polyisocyanates are preferred, including for example, diisocyanates, triisocyanates. Polyisocyanates having 4 to 25 carbon atoms and from 2 to 4 isocyanate groups per molecule are preferred.

In an aspect, the water-dispersible polyurethanes are prepared by reacting one or more isocyanates with one or more hydroxy-functional compounds. Preferred hydroxy-functional compounds include, without limitation, compounds with ethylenic unsaturation as well as salt-forming functionality. Suitable hydroxy-functional compounds include, for example, hydroxy-functional (meth)acrylates and hydroxy-functional (meth)allyl ethers. Examples of suitable hydroxy-functional (meth)acrylate and (meth)allyl ether compounds are described, for example, in U.S. Pat. No. 7,605,209, the disclosure of which is incorporated herein by reference.

In an embodiment, the water-dispersible ethylenically unsaturated polyurethanes are prepared using vinyl ethers. A suitable vinyl ether compound includes at least one hydroxyl group and one or more vinyl ether groups. Examples of suitable vinyl ethers include 4-hydroxybutyl vinyl ether, cyclohexanedimethanol monovinyl ether, ethylene glycol monovinyl ether, diethylene glycol monovinyl ether, and the like. In an embodiment, the water-dispersible ethylenically unsaturated polyurethanes are prepared by reacting an ester polyol made from an aromatic or aliphatic polyol and containing at least two —OH groups per molecule with a fatty acid wherein a portion of the fatty acid contains auto-oxidative carbon-carbon double bonds. Suitable polyols include, for example, ethylene glycol, ethylene glycol, propylene glycol, and the like. In an embodiment, the water-dispersible ethylenically unsaturated polyurethanes are prepared using the reaction product formed by transesterification of an oil containing autooxidative carbon-carbon double bonds, with an aromatic or aliphatic polyol containing at least two —OH groups per molecule. Suitable oils are known in the art and include, for example, linseed oil, safflower oil, soybean oil, tall oil, sunflower oil, dehydrated castor oil, castor oil, ricine oil, tung oil, sardine oil, olive oil, cottonseed oil and mixtures thereof.

Oil-modified polymers, preferably, hydroxyl-functional alkyds can also be used to develop ethylenic unsaturated polyurethanes. Alkyds can be prepared by any method known in the art. An example of a method to prepare an alkyd includes the transesterification of an oil and polyol with a further reaction with polybasic acids and optionally, further polyols. In addition, polybasic acids and fatty acids can be reacted with polyols in suitable proportions. The reaction of the polyols with polybasic acids and fatty acids and/or oils can be catalyzed by transesterification catalysts such as calcium naphthenate, lithium neodecanoate, zinc acetate, tin oxide and the like. A color stabilizer such as trisnonyl phenyl phosphite may also be added. Suitable polyols include, for example, ethylene glycol, propylene glycol, and the like. Suitable oils and/or fatty acids, and other reactants useful in making an alkyd or other oil-modified polymer include, for example, linseed oil, safflower oil, cottonseed oil, tall oil, sunflower oil, dehydrated castor oil, castor oil, groundnut oil, wood oil, tung oil, ricine oil, coconut oil, sardine oil, olive oil, and the like.

Conventionally, to facilitate manufacture, the polyurethane prepolymer can be made in the presence of a solvent that is either left in the dispersion, or removed as one of the last steps in production to provide a low solvent or solvent-free product. Solvents that can be easily removed are usually volatile solvents, such as acetone or methyl ethyl ketone. In place of such solvents (or a portion of such solvents), however, one or more reactive diluents (as described below) are used.

In an embodiment, the coating composition described herein is a radiation-curable acrylic coating composition that includes a support polymer composition. In an aspect, the support polymer composition is a water-based latex polymer or emulsion. In another aspect, the water-based support polymer is a multi-stage latex emulsion. Preferred multi-stage latex emulsions are alkali-soluble. In an aspect, the multi-stage latex emulsion has polymer content of 40 wt-% to 75 wt-%, preferably 45 wt-% to 55 wt-%, based on the total weight of the latex.

The polymers in the latex preferably include one or more polymers selected from (i) synthetic polymers of up to 90 wt-% of a mixture of one more monomers selected from the group consisting of $C_8$-$C_{12}$ vinyl aromatic monomers which may be unsubstituted or substituted by a $C_1$-$C_4$ alkyl radical or a chlorine or bromine atom; $C_1$-$C_4$ alkyl and hydroxy alkyl acrylates; $C_1$-$C_4$ alkyl and hydroxy alkyl methacrylates; and $C_2$-$C_6$ alkenyl nitriles; up to 60 weight percent of a $C_4$-$C_6$ conjugated diolefin, which may be unsubstituted or substituted by a chlorine atom; and optionally up to 10 weight percent of one or more monomers selected from the group consisting of: (a) $C_3$-$C_6$ ethylenically unsaturated carboxylic acids; (b) amides of $C_3$-$C_6$ ethylenically unsaturated carboxylic acids, which amides may be unsubstituted or substituted at the nitrogen atom by up to two radicals selected from the group consisting of $C_1$-$C_4$ alkyl radicals and $C_1$-$C_4$ hydroxy alkyl radicals, (ii) natural rubber latex; and a mixture of either (i) or (ii).

In an embodiment, the support polymer composition is a water-based latex emulsion. In an aspect, the latex emulsion includes at least a first stage polymer that is an emulsion or a copolymer of a vinyl aromatic monomer and an ester or salt of an unsaturated carboxylic acid, i.e. acrylate. In an aspect, the vinyl aromatic monomer and the acrylate are in a ratio of 20:80 to 80:20. In an aspect, the first stage includes monomers that would form a polymer or emulsion or copolymer with a theoretical glass transition temperature (or $T_g$) of preferably 60° C. to 110° C., more preferably 75° C. to 105° C., and most preferably 85° C. to 100°. In an aspect, the latex emulsion is a styrene-acrylic emulsion. In an embodiment, the latex polymer emulsion includes a multi-stage polymer latex or emulsion. In an aspect, the first stage polymer is an emulsion or a copolymer of a vinyl aromatic monomer and an ester or salt of an unsaturated carboxylic acid, i.e. acrylate, as described above, while the second stage polymer includes an emulsion or a copolymer of an unsaturated carboxylic acid, i.e. acrylate. In an aspect, the second stage includes monomers that would form a polymer or emulsion or copolymer with a theoretical glass transition temperature (or $T_g$) of preferably −10° C. to 50° C., more preferably 0° C. to 40° C., and most preferably 10° C. to 30° C.

The support polymer includes a latex emulsion made by methods known to those of skill in the art. Suitable monomers are well known in the art. Vinyl aromatic monomers include styrene and α-methyl styrene and their homologs, for example. Suitable acrylates include methyl acrylate, methyl methacrylate, ethyl acrylate, hydroxyethyl acrylates, ethyl methacrylate, hydroxy ethyl methacrylate, and their ethylenically unsaturated carboxylic acids include acrylic, methacrylic, itaconic and fumaric acids. Lower esters of those acids may also be present in the functional polymers. The functional polymer may also include aldehydes such as acrolein or amides of the above acrylamide, methacrylamide and N-methylol acrylamide.

In an embodiment, the coating composition described herein optionally includes a reactive diluent. As used herein, the term "reactive diluent" includes one or more relatively low molecular weight compounds that react with at least one of the following: a polymer, itself, another reactive diluent, or any combination of these. A reactive diluent can form an interpenetrating network with the polymer or can crosslink with the polymer. The reactive diluent can be a monomer, oligomer or polymer. In an aspect, the reactive diluent is present in an amount of preferably at least 5 wt-%, more preferably at least 10 wt-%, and most preferably at least 15 wt-%, based on the combined weight of the reactive diluents and the polymer component of the composition. The reactive diluent is present in an amount of preferably no more than 40 wt-%, more preferably no more than 30 wt-% and most preferably, no more than 25 wt-%, based on the combined weight of the reactive diluent and the polymer component of the composition.

Compounds that function as reactive diluents are of relatively low molecular weight and can be reactive monomers, oligomers, or low molecular weight polymers. A compound that can function as a reactive diluent is one that can react with at least one of the polymer (the water-dispersible polymer or oil-modified polymer), itself, another reactive diluent, or all of these. The polymer and reactive diluent can form, for example, an interpenetrating network. Alternatively, the reactive diluent can participate in cross-linking the polymer.

Suitable reactive diluent compounds have a relatively low molecular weight. Preferably, suitable reactive diluent compounds have a molecular weight of at least 350 grams/mole (g/mol). Preferably, the molecular weight is no more than 1000 g/mol. Preferred reactive diluents are substantially free of ethylene oxide and propylene oxide moieties. More preferably, they are essentially free of ethylene oxide and propylene oxide moieties. Most preferably, they are completely free of ethylene oxide and propylene oxide moieties. "Substantially free" means that less than 5 wt-% ethylene oxide and propylene oxide moieties are present in the reactive diluent. "Essentially free" means that less than 1 wt-% ethylene oxide and propylene oxide moieties are present in the reactive diluent. "Completely free" means that less than 0.5 wt-% ethylene oxide and propylene oxide moieties are present in the reactive diluent. Reactive diluents typically include compounds with ethylenic unsaturation. Suitable such compounds include a (meth)acrylate, a vinyl ether, a (meth)allyl ether, or mixtures or copolymers thereof. Preferred reactive diluents include (meth)acrylate functional compounds. Of these, the preferred reactive diluent compounds are di-(trimethylolpropane tetraacrylate) and di-trimethylolpropane tetramethacrylate). Reactive diluents used in coating compositions of the present invention if desired can include mixtures of compounds. Exemplary compounds that can be used as reactive diluents in the coating composition described herein are further described in U.S. Pat. No. 7,605,209, incorporated herein by reference.

In an embodiment, the coating composition described herein preferably has viscosity below 100,000 cps, more preferably below 30,000 cps, even more preferably below 15,000 cps, and most preferably below 5,000 cps. Optimally, the viscosity is below 1000 cps under processing or use conditions.

In an embodiment, the coating composition described herein is preferably substantially free of VOC. Preferably, the coating composition includes no more than 7 wt-% VOC. More preferably, the coating composition includes no more than 4 wt-% VOC.

In an embodiment, the coating composition described herein preferably has no more 10 wt-% surfactant. More preferably, the coating composition has no more than 5 wt-% surfactant, and most preferably, the composition has no more than 2 wt-% surfactant.

In an embodiment, the coating composition described herein further includes one or more pigments or colorants. Suitable pigments and colorants for use with the present invention are known in the art, and include titanium dioxide white, carbon black, lamp black, black iron oxide, red iron oxide, yellow iron oxide, brown iron oxide (a blend of yellow and red oxide with black oxide), phthalocyanine green, phthalocyanine blue, organic reds (such as naphthol red, quinacridone red and toluidine red), quinacridone magenta, quinacridone violet, DNA orange, and/or organic yellows (such as Hansa yellow), for example.

In an embodiment, the coating composition described herein further includes one or more commercially available colorants. In an aspect, the coating composition is a low-pigment or pigment-free composition to which one or more colorants can be added in order to provide a palette of colors for the color sampling display product. The term "colorant" refers to a substance or material added to the coating composition described herein in order to modify or alter its color or hue. Colorants include dye, pigment, ink and the like, for example. Commercially available colorants which can be used with the coating composition described herein include, for example, NovoColor (Color Corp. of America, Marengo, Ill.) colorants, i.e. zero-VOC colorants compatible with water-based coating compositions.

In an embodiment, the coating composition described herein further includes one or more additives. Suitable additives for use in coating compositions of the present invention are known in the art, and further described in Koleske et al., Paint and Coatings Industry, April, 2003, pp. 12-86. Suitable additives include, without limitation, fillers, thixotropes, rheological modifiers, matting agents and the like. The additives include one or more ingredients added to the composition to modify the properties or enhance the performance of the curable coating composition during storage, handling, application and other or subsequent stages. Desirable performance characteristics of the coating include, without limitation, chemical resistance, abrasion resistance, hardness, gloss, reflectivity, appearance and/or a combination of such properties and similar other properties. Performance enhancing additives include waxes, flatting agents, additives to prevent mar and abrasion and the like. In an aspect, the wax additives used in the coating composition described herein include, for example, linear waxes, wax emulsions and the like. Suitable wax emulsions include water-dispersible wax emulsions such as, for example, JON-WAX, an additive that enhances mar, scratch and scrub resistance. In an aspect, linear waxes used with the coating compositions described herein are water soluble. Suitable water-soluble linear waxes include, without limitation, compositions made from polyethylene glycol (PEG), for example. In an aspect, the PEG compositions have weight-average molecular weights (Mw) of about 300 to about 1000, preferably about 400 to about 800, and more preferably, about 500 to about 700.

In an embodiment, the coating composition described herein further includes appearance- and/or performance-enhancing additives such as lacquer, for example, included in order to achieve a glossy finish when the composition is applied to the paper substrate and cured. In an aspect, where a semi-gloss finish is desired, a clear lacquer is used.

In an embodiment, the method described herein includes preparing a radiation-curable coating composition for application to at least a first major surface of a substrate. In an aspect, a water-based acrylate functional polyurethane dispersion (PUD) is mixed with a styrene-acrylic functional latex polymer emulsion in a ratio of preferably, 1 part by weight of water-based acrylate functional PUD to 1 part by weight of the styrene-acrylic functional latex, more preferably 1 part by weight of water-based acrylate functional PUD to 2 parts by weight of the styrene-acrylic functional latex, and most preferably 1 part by weight of the water-based acrylate functional PUD to 3.25 parts by weight of the styrene-acrylic functional latex. The PUD and latex are mixed with sufficient water, ammonia and additives such as colorants, wax, talc, silica and other additives. Other additives include, for example, antimicrobial agents, defoaming agents, thickening agents, thixotropes, plasticizers. A film-forming amount of the composition is applied to the first major surface of an untreated paper substrate by standard methods of application. The coating is then cured by an electron-beam-curing process to provide the color display product described herein.

The coating prepared, applied and cured as described herein meets the industry requirements for color sampling display products. Preferred coatings as described herein preferably exhibit good adhesion to the substrate, excellent block resistance and scrub resistance. In addition, the coating composition, when applied to an untreated paper substrate does not cause the paper to wrinkle, buckle or curl, allowing the ultimate color sampling display product to have mechanical integrity and aesthetic appeal.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A color sampling display product made by a method comprising:
   providing an unsized paper substrate with a thickness of about 50 μm to about 125 μm and having at least a first major surface to which a coating composition can be applied;
   applying a film-forming amount of a radiation-curable coating composition comprising one or more polymers to the first major surface of the unsized paper substrate to form a visually opaque colored film; and
   using electron beam radiation to cure the applied coating composition onto the first major surface of the paper substrate,
   thereby forming an interpenetrating network of crosslinks between the one or more polymers in the coating composition,
   wherein the color sampling display product comprises a device for accurate display of one or more colors.

2. A color sampling display product, comprising:
   a device showing one or more colors, the device further comprising:
      an unsized paper substrate with a thickness of about 50 μm to about 125 μm and having at least a first major surface to which a coating composition can be applied; and
      a radiation-cured film of an acrylic coating composition comprising one or more polymers applied to at least the first major surface of the unsized paper substrate,
   wherein the cured film comprises an interpenetrating network of crosslinks between the one or more polymers in the acrylic coating composition.

3. The color sampling display product of claim 2, wherein the device is a color card.

4. The color sampling display product of claim 2, wherein the device is not wrinkled, buckled or curled.

5. The color sampling display product of claim 2, wherein the acrylic coating composition comprises:
   a water-based polymer composition; and
   a support polymer composition;
   wherein the acrylic coating composition is substantially free of volatile organic compounds, and comprises no more than about 5 wt-% surfactant.

6. The color sampling display product of claim 5, wherein the water-based polymer composition comprises a water-dispersible polymer selected from the group consisting of polyurethanes, epoxies, polyamides, chlorinated polyolefins, acrylics, oil-modified polymers, polyesters and mixtures thereof.

7. The color sampling display product of claim 6, wherein the water-dispersible polymer is an ethylenically unsaturated polyurethane.

8. The color sampling display product of claim 7, wherein the ethylenically unsaturated polyurethane comprises (meth)acrylate functionality.

9. The color sampling display product of claim 7, wherein the ethylenic unsaturation comprises auto-oxidative carbon-carbon double bonds.

10. The color sampling display product of claim 5, wherein the support polymer composition comprises a latex emulsion.

11. The color sampling display product of claim 10, wherein the latex emulsion comprises at least a first stage comprising a styrene-acrylic emulsion.

12. The color sampling display product of claim 10, wherein the latex emulsion comprises a multi-stage polymer latex, comprising:
   at least a first stage wherein monomers forming the first stage would form a polymer having a theoretical glass transition temperature in the range of 60° C. and 110° C.; and
   at least a second stage wherein monomers forming the second stage would form a polymer having a theoretical glass transition temperature in the range of 10° C. to 50° C.

13. The color sampling display product of claim 10, wherein the latex emulsion is alkali soluble.

14. The color sampling display product of claim 5, wherein the acrylic coating composition further comprises an efficacious amount of a performance-enhancing additive.

15. The color sampling display product of claim 14, wherein the performance-enhancing additive is selected from the group consisting of waxes, flatting agents, mar and abrasion additives, and mixtures or combinations thereof.

16. The color sampling display product of claim 14, wherein the performance-enhancing additive comprises a water-soluble linear polymer with a weight average molecular weight ($M_w$) of about 300 to about 1000.

17. The color sampling display product of claim 16, wherein the water-soluble linear polymer comprises polyethylene glycol with a weight average molecular weight ($M_w$) of about 400 to about 800.

18. The color sampling display product of claim 2, wherein the acrylic coating composition comprises:
   a water-based polymer comprising a water-dispersible polymer selected from the group consisting of polyurethanes, epoxies, polyamides, chlorinated polyolefins, acrylics, oil-modified polymers, polyesters and mixtures thereof; and
   a support polymer comprising a latex emulsion.

19. The color sampling display product of claim 18, wherein the water-dispersible polymer is an ethylenically unsaturated polyurethane and the support polymer is a styrene-acrylic emulsion.

* * * * *